(12) United States Patent
Fan et al.

(10) Patent No.: US 12,462,790 B2
(45) Date of Patent: Nov. 4, 2025

(54) QUALITY ESTIMATION FOR AUTOMATIC SPEECH RECOGNITION

(71) Applicant: Alibaba Group Holding Limited, Grand Cayman (KY)

(72) Inventors: Kai Fan, Sunnyvale, CA (US); Bo Li, Hangzhou (CN); Jiayi Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 291 days.

(21) Appl. No.: 18/224,514

(22) Filed: Jul. 20, 2023

(65) Prior Publication Data

US 2023/0360636 A1     Nov. 9, 2023

Related U.S. Application Data

(63) Continuation of application No. PCT/CN2021/073073, filed on Jan. 21, 2021.

(51) Int. Cl.
G10L 15/01     (2013.01)
G10L 15/06     (2013.01)

(52) U.S. Cl.
CPC ............ *G10L 15/01* (2013.01); *G10L 15/063* (2013.01)

(58) Field of Classification Search
CPC ....................................................... G10L 15/01
(Continued)

(56) References Cited

U.S. PATENT DOCUMENTS 8,675,754 B1 * 3/2014 Yonge, III ................ H04L 5/12
                                                         375/261
10,147,428 B1 * 12/2018 Shastry ................ H04N 19/187
(Continued)

FOREIGN PATENT DOCUMENTS

| CN | 109791631 A | 5/2019 |
| JP | 2010210816 A | 9/2010 |
| WO | 2019151507 A1 | 8/2019 |

OTHER PUBLICATIONS

N. Morgan and H. A. Bourlard, "Neural networks for statistical recognition of continuous speech," in Proceedings of the IEEE, vol. 83, No. 5, pp. 742-772, May 1995, doi: 10.1109/5.381844. keywords: {Neural networks;Speech recognition; Hidden Markov models; Artificial neural networks;Automatic speech re (Year: 1995).*
(Continued)

*Primary Examiner* — Bharatkumar S Shah
(74) *Attorney, Agent, or Firm* — Lee & Hayes, P.C.

(57) ABSTRACT

Methods and systems are provided for implementing quality estimation for automatic speech recognition, and more specifically training an ASR model, and training a QE model to perform word error rate prediction upon the trained ASR model. The ASR model may be a transformer learning model having an architecture including an encoder including multi-head attention layers, and a memory encoder including a masking multi-head attention layer. The QE model may include a binary classification model and a regression model, where the binary classification model is based on a discrete statistical distribution, and the regression model is based on a continuous statistical distribution. Training the ASR model may produce output having variable word error rates, and the QE model may be trained based on empirical word error rates of the ASR model. The QE model may
(Continued)

predict performance of the ASR model without labor-intensive labeling to generate ground truth.

20 Claims, 5 Drawing Sheets

(58) Field of Classification Search
USPC .......................................................... 704/232
See application file for complete search history.

(56) References Cited

U.S. PATENT DOCUMENTS

| | | | | |
|---|---|---|---|---|
| 10,380,997 | B1* | 8/2019 | Ward | G10L 15/02 |
| 11,615,799 | B2* | 3/2023 | Zhu | G06F 16/345 |
| | | | | 704/235 |
| 11,735,309 | B2* | 8/2023 | Purdie | G16H 50/20 |
| | | | | 705/2 |
| 12,169,663 | B1* | 12/2024 | Nagisetty | G06F 3/165 |
| 2005/0228670 | A1* | 10/2005 | Mahajan | G10L 15/197 |
| | | | | 704/256 |
| 2017/0221474 | A1* | 8/2017 | Hori | G10L 15/08 |
| 2018/0046767 | A1* | 2/2018 | Tulabandhula | G06Q 30/0231 |
| 2018/0211725 | A1* | 7/2018 | Purdie | G16H 10/60 |
| 2018/0286386 | A1* | 10/2018 | Baughman | G10L 15/30 |
| 2020/0043483 | A1* | 2/2020 | Prabhavalkar | G10L 15/16 |
| 2020/0175961 | A1* | 6/2020 | Thomson | G10L 15/28 |
| 2020/0243094 | A1* | 7/2020 | Thomson | G10L 15/28 |

OTHER PUBLICATIONS

PCT Search Report & Written Opinion for Application No. PCT/CN2021/073073, mailed on Oct. 26, 2021, 8 pages.

Search Report and Written Opinion for European Application No. 21920245.4, Dated Jul. 19, 2024, 7 pages.

Fan, et al., "Neural Zero-Inflated Quality Estimation Model for Automatic Speech Recognition System", arxiv.org, Aug. 28, 2020.

* cited by examiner

QUALITY ESTIMATION FOR AUTOMATIC SPEECH RECOGNITION

CROSS REFERENCE TO RELATED APPLICATIONS

This application claims priority to and is a continuation of PCT Patent Application No. PCT/CN2021/073073, filed on 21 Jan. 2021 and entitled "QUALITY ESTIMATION FOR AUTOMATIC SPEECH RECOGNITION," which is incorporated herein by reference in its entirety.

BACKGROUND

In the growing field of automatic speech recognition ("ASR") applications of machine learning, quality estimation ("QE") has emerged as a discipline of growing interest. QE refers to a variety of techniques which may be deployed by researchers and operators of machine learning systems to determine error rates of outputs of various implementations of ASR. However, ASR applications generally output recognized text corresponding to prolonged samples of speech, meaning that error rates may be highly granular on a per-word basis, commonly referred to as word error rate ("WER"). Consequently, a naive approach to QE may entail manually labeling text content of entire speech samples. Such an approach is, naturally, highly labor-intensive.

In the absence of labeling, another approach is to model probability of errors using a statistical distribution. However, in practice, known statistical distributions tend to be ill-suited to modeling empirical distributions of ASR WERs. In contemporary ASR implementations, the majority of words, if not all words, are recognized correctly, with errors a minority; no known statistical distributions can be readily applied to such a trend by methods such as regression.

Thus, there is a need for a statistical analysis approach tailored to the problem of QE for ASR applications, avoiding the need to laboriously generate labeled ground truth references, and achieving modeling of error rates which robustly reflects distributions of ASR errors in practice.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to implementing quality estimation for automatic speech recognition, and more specifically training an ASR model, and training a QE model to perform word error rate prediction upon the trained ASR model.

A learning model, according to example embodiments of the present disclosure, may include one or more sets of computer-executable instructions executable by one or more processors of a computing system to perform tasks that include processing input having various parameters and outputting results. A learning model may be, for example, a layered model such as a deep neural network, which may have a fully-connected structure, may have a feedforward structure such as a convolutional neural network ("CNN"); may have a backpropagation structure such as a recurrent neural network ("RNN"); may further be structured having layers outputting in opposite directions, such as bidirectional encoder representations from transformers ("BERT"); may further be structured having feedback loops within layers, such as a long short-term memory ("LSTM") neural network; may further combine these structures, such as a bidirectional long short-term memory ("Bi-LSTM") neural network; and may or may have other architectures suited to the computation of particular tasks. Tasks may include, for example, classification, regression, and the like.

A learning model may configure a computing system to perform computations for a task on inputs of various categories of data, wherein the inputs may be compressed, and features extracted therefrom, before the computing system performs computations upon the extracted features.

A learning model may be trained to configure a computing system to compute a task taking at least audio signals as input, such tasks providing output for functions including annotation of audio and/or video, transcription of audio and/or video, source separation of audio, voice control of mobile devices, smart devices, smart appliances, and the like.

Cloud computing systems may provide collections of server nodes hosting computing resources to provide distributed computing, parallel computing, improved availability of physical or virtual computing resources, and such benefits. Data centers implemented in cloud computing systems may host learning models to provide these benefits for the application of computing using learning models.

A cloud computing system may connect to various end devices which collect data to be input into learning models to train the learning models and/or in association with various tasks for the computation and output of results required for the performance of those tasks. End devices may connect to the cloud computing system through edge nodes of the cloud computing system. An edge node may be any server providing an outbound connection from connections to other nodes of the cloud computing system, and thus may demarcate a logical edge, and not necessarily a physical edge, of a network of the cloud computing system. Moreover, an edge node may be edge-based logical nodes that deploy non-centralized computing resources of the cloud computing system, such as cloudlets, fog nodes, and the like.

For example, massive quantities of captured data may result in intolerable latency during transport over communication and data transfer interfaces for computing by a learning model executing on computing nodes. Moreover, raw, uncompressed audio signals may be highly inefficient for ASR tasks due to containing data having many times higher resolution than needed for computation purposes.

Consequently, it is known to persons skilled in the art to transform audio signals into a frequency representation thereof by a transform algorithm such as, for example, Fourier transform, and to transform audio signals from a time domain representation (i.e., wave data) into a frequency domain representation by Fourier-related algorithms such as short-time Fourier transform ("STFT"). An inverse of the STFT ("ISTFT") may further operate to return a frequency domain representation of audio signals to a time domain representation. Commonly, STFT is utilized by dividing a time domain representation of audio signals into time windows of known duration; frequency-domain representations in each time window (henceforth referenced as "time-frequency representations") may be subsequently visualized in spectrograms showing the magnitude STFT of the audio signals. Moreover, in discrete-time applications of STFT, the audio signals may be divided over the time domain into discrete frames having some overlap, the frames being individually preprocessed by STFT.

After preprocessing by STFT, time-frequency representations of audio signals may be separable into bands and sub-bands thereof, each band and sub-bands thereof representing particular frequencies of the audio signals. Frequency domain representations of audio signals may be referenced by parameters k indicating a particular band or sub-band thereof, and t representing a particular frame thereof.

For the purpose of understanding example embodiments of the present disclosure, a time-frequency representation of audio signals may be equivalently described, as well as illustrated in drawings, as a spectrogram, which constitutes a visualization of a time-frequency representation of audio signals.

Moreover, time-frequency representations of audio signals, particularly speech, may be parameterized as a number of utterances, which may be separated into tokens. By techniques known to persons skilled in the art, audio signals may be tokenized into a plurality of tokens, where each token may include a word, a syllable, a phone (as defined in phonetics), and the like.

According to example embodiments of the present disclosure, multiple learning models as described above may be connected to establish a transformer learning model. In general, a transformer learning model maps an input having multiple input elements to an output having multiple output elements. Unlike other sequence-to-sequence learning models, a transformer maps elements of the input to other elements of the input by a multi-head attention layer, implemented by dot product operations. Mapping attention among elements of the input may be performed using an attention model, which may include, for example, self-attention mechanisms, which shall be described in further detail subsequently.

It is known to persons skilled in the art that transformer learning models may be implemented based on an encoder-decoder architecture such as BERT as mentioned above, including an encoder and a decoder each made up of multi-head attention layers and feedforward layers. For example, transformer learning models may be implemented for linguistic translation or prediction tasks, wherein a sequence of word tokens is input into the transformer learning model and a translated or predicted sequence of word tokens is output from the transformer learning model.

According to example embodiments of the present disclosure, instead of translation or prediction tasks, transformer learning models may be implemented for automatic audio recognition ("ASR") tasks, wherein a sequence of audio tokens is input into the transformer learning model and a sequence of word tokens is output from the transformer learning model.

In implementing a transformer learning model to compute a task, it is additionally desirable to evaluate the accuracy of the transformer leaning model in performing the task. For example, in conventional examples of transformer learning models, an error may occur in translating a word token of an input sequence to a word token of a second sequence, and each such error may increase a translation error rate ("TER").

According to example embodiments of the present disclosure, an error may occur in mapping an audio token of an input sequence to a word token of a second sequence, and each such error may increase a word error rate ("WER"), as such errors shall be designated for the purpose of understanding the present disclosure. For example, not all audio tokens of the input sequence may correspond to an utterance (as described above), and an audio token containing only noise may be incorrectly treated as an utterance and mapped to a word, resulting in an error which increases WER.

Error rates of transformer learning models may be modeled by a regression models. According to example embodiments of the present disclosure, a regression model may include a set of equations fitted to observations of error rates of the output of a transformer learning model over one or more input datasets. Equations of a regression model may be computed based on trends in observed frequencies over an independent variable, where an independent variable according to example embodiments of the present disclosure may be, for example, an error rate as shall be subsequently described.

A regression model may be based on a continuous statistical distribution (where the statistical distribution may be referred to as a "prior"), wherein a frequency is modeled as being a continuous function of an independent variable, based on an expectation that the frequencies will may be modeled by a function having the independent variable as a parameter along a continuous range of values of the independent variable. Regression models may be selected based on a prior of variables of the frequency, which may include non-linear statistical distributions such as, for example, binomial distributions, Bernoulli distributions, Laplacian distributions and the like, and thus a regression model may be, for example, a generalized non-linear model based on a given prior.

Aside from continuous statistical distributions, discrete statistical distribution may define a frequency as having, respectively, defined values for certain particular values of the independent variable. While frequency distributions may not be regressed to fit discrete statistical distributions, such distributions may further play a role in regression models, as shall be subsequently described.

Outputs of a transformer learning model may be evaluated for error rate. For example, it is always possible to compare output of any learning model to manually labeled datasets representing ground truth of expected output, so as to empirically determine error rate of the learning model output. However, it is not desirable to rely solely on labeled datasets to empirically evaluation error rate evaluation, since labeling of sample datasets is labor-intensive and defeats the purpose of training the transformer learning model. Therefore, after empirical evaluation using labeled datasets is established, a regression learning model may be trained on output error rates of transformer learning models to fit a regression model to the empirical output error rates, such that the regression model is parameterized based on characteristics of the transformer learning model. The parameterized regression model may thereby be configured to predict output error rates of the transformer learning model for future computations. By evaluating error rate of the transformer learning model, researchers and operators of machine learning systems may take further steps to fine-tune the transformer learning model to improve accuracy.

Therefore, first, empirical evaluation of the transformation learning model output error rates should be established. In conventional examples of transformer learning models, TERs may be empirically evaluated based on scoring a translated sequence of word tokens in accuracy of each word token compared to word tokens of an expected translated sequence as labeled, given a certain input sequence of word tokens.

Naively, this approach may also be used to empirically evaluate WERs, scoring a recognized sequence of word tokens in accuracy of each word token compared to an expected recognized sequence. However, for the purpose of subsequently using the empirically evaluated WERs to parameterize a regression model, such an approach has shortcomings. Unlike transformer learning models computing translation or prediction tasks, an ASR transformer learning model according to example embodiments of the present disclosure receives input sequences of different modalities: a feature representation, and a token sequence. It is challenging to construct a regression model to consume inputs of two different modalities.

Additionally, according to empirical observations of WERs of a transformer learning model computing ASR tasks, the highest frequencies tend to occur for WERs near zero; that is, performance of ASR transformer learning models tends to be near perfect, and fine-tuning is generally with regard to a minority of errors which occur. It is further challenging to construct a regression model to reflect a statistical distribution which is skewed towards values of 0 for an independent variable.

Figure 1:
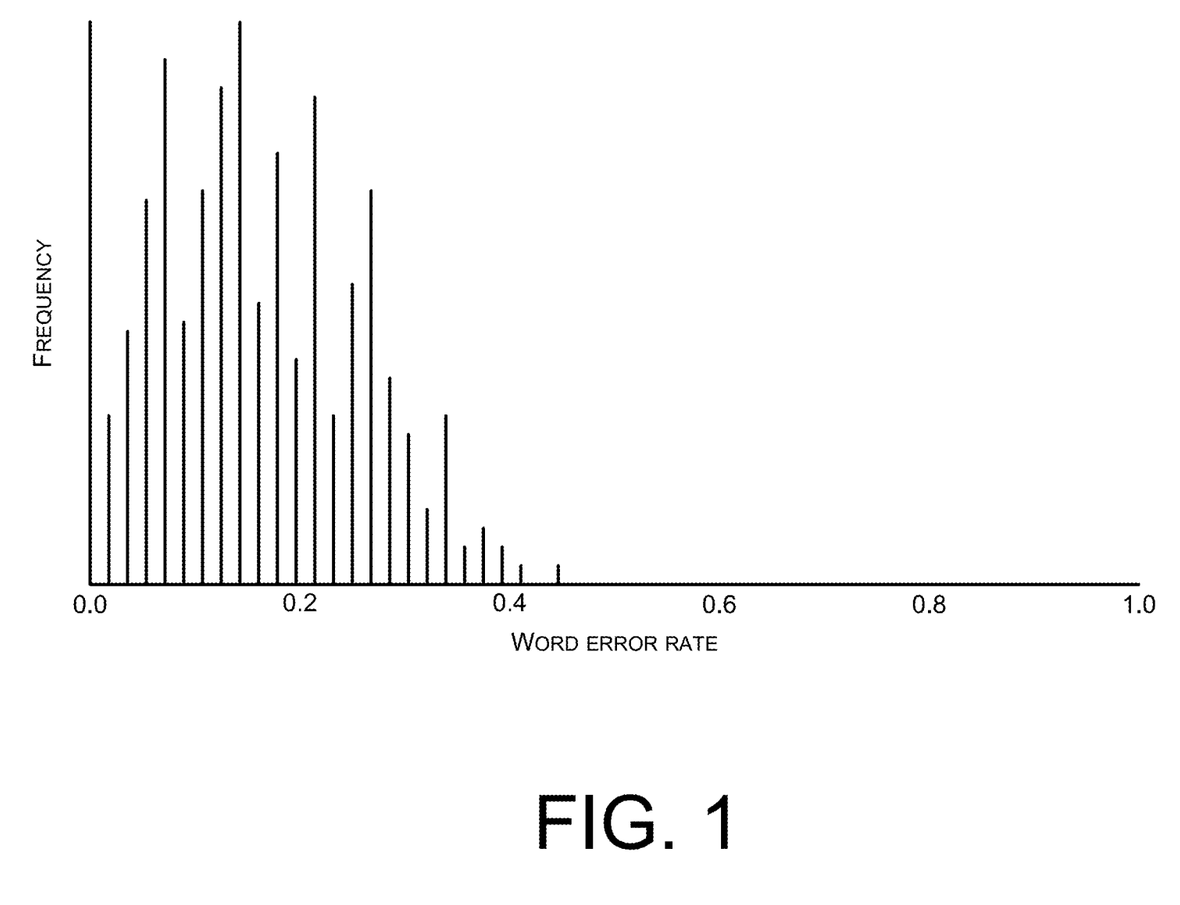
FIG. 1 illustrates an empirical distribution of word error rates of an automatic speech recognition transformer learning model.

FIG. 1 illustrates an empirical distribution of WERs of an ASR transformer learning model. The clustering of frequencies (illustrated as the vertical axis) at WER values (illustrated as the horizontal axis) near zero is illustrated herein.

Therefore, to facilitate evaluating WER of a transformer learning model computing ASR tasks, example embodiments of the present disclosure provide for training a transformer learning model, such as a BERT, for computing ASR tasks. Example embodiments of the present disclosure then provide for, subsequent to training the transformer learning model, evaluating WER of the transformer learning model.

In contrast to an encoder-decoder architecture as described above, the decoder of the transformer learning model may be replaced with a memory encoder, where the memory encoder takes an embedding of feature representations of audio tokens as input, in addition to the audio tokens, and encodes the embedding of audio tokens to output a probabilistic prediction of word tokens.

Example embodiments of the present disclosure further provide for inputting the encoding of the embedding of audio tokens, as feature representations, into a regression learning model. The regression learning model may learn one or more parameters of one or more regression models which describe frequencies over a continuous range of WERs for the transformer learning model. However, additionally, frequencies for certain discrete WERs may be described by a discrete statistical distribution.

Thus, a regression model according to example embodiments of the present disclosure may be based upon a continuous statistical distribution mixed with components of a discrete statistical distribution, implementation of which shall be described subsequently.

Pre-training of an ASR transformer learning model according to example embodiments of the present disclosure shall subsequently be described. In advance of implementing example embodiments of the present disclosure, an ASR transformer learning model may be pre-trained by steps as described below. Elements of the ASR transformer learning model are further described with reference to FIG. 2.

Figure 2:
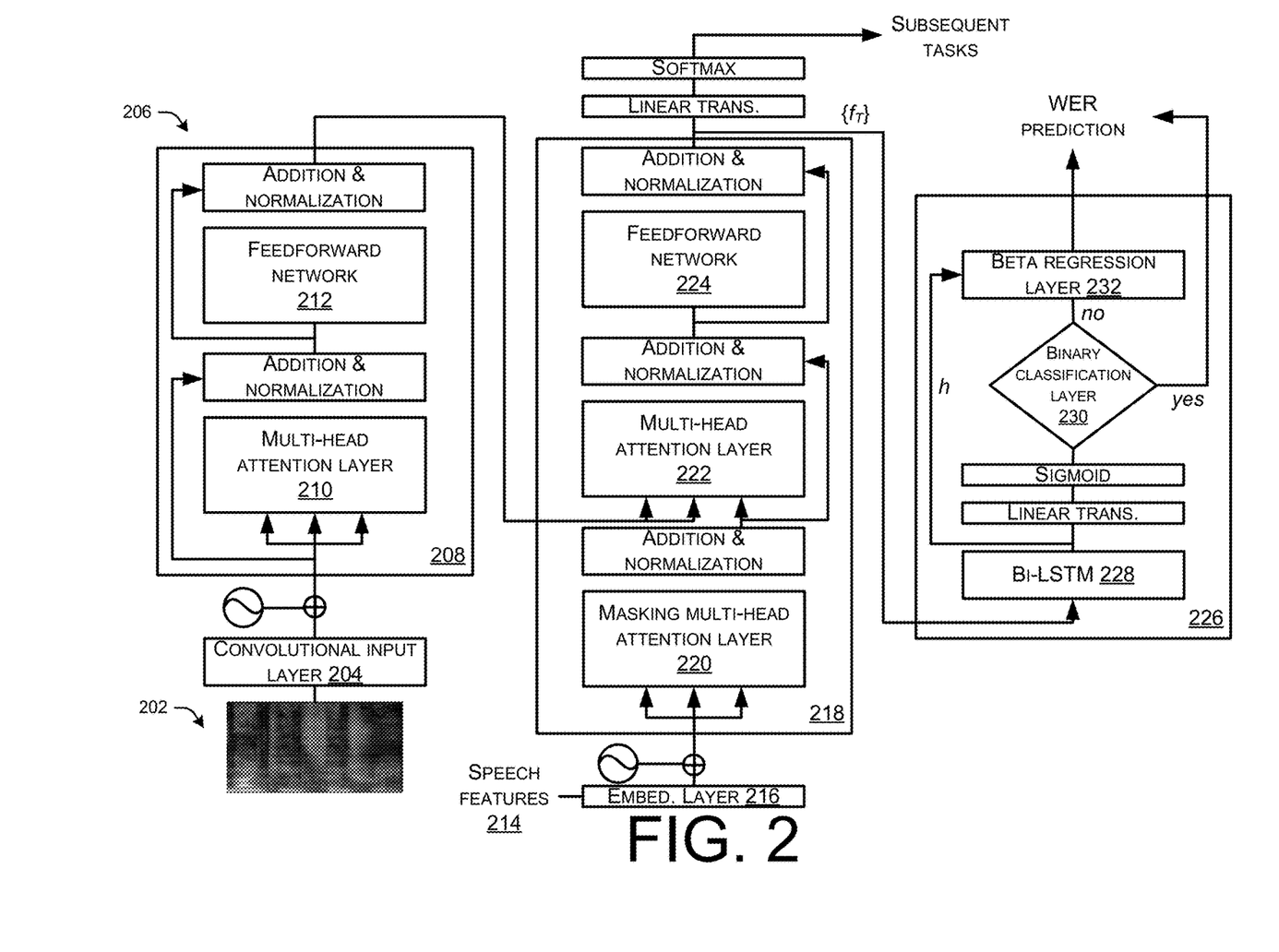
FIG. 2 illustrates a schematic diagram of an automatic speech recognition transformer learning model and a quality estimation learning model.

The ASR transformer learning model 200, as illustrated in FIG. 2, may be stored on storage of a computing system having one or more processor(s) operative to execute one or more sets of computer-executable instructions of the transformer learning model.

Reference datasets may generally be any labeled dataset including some number of sequences of audio tokens (which may have been tokenized from an audio signal by techniques as known to persons skilled in the art), wherein each sequence of audio tokens is labeled with a corresponding sequence of word token labels. The word token labels may represent a ground truth of text which correctly represents speech within an original audio signal from which a sequence of audio tokens was tokenized. Given a sequence of word token outputs from a transformer learning model, a WER score of 0 may indicate that all word token outputs match the word token labels; a WER score of 1 may indicate that no word token outputs match the word token labels; and WER scores within a continuous range bounded by 0 and 1 may indicate, proportionately, that some word token outputs match the word token labels, while others do not.

Thus, labeled reference datasets according to example embodiments of the present disclosure may be manually labeled, though such manual labels are generated in the interest of expediting prediction of ASR transformer learning model WERs by parameterizing a regression model, to alleviate the need to manually label additional reference datasets in the future.

A loss function, or more generally an objective function, may be any mathematical function having an output which may be optimized during the training of a learning model.

A learning model may be trained on at least one loss function to learn a parameter set which may be used in computation of tasks. For example, an ASR transformer learning model according to example embodiments of the present disclosure may be trained to optimize a first loss function so as to learn a parameter set enabling the ASR transformer learning model to map sequences of audio tokens to sequences of word tokens. For example, a regression learning model according to example embodiments of the present disclosure may be trained to optimize a second loss function so as to parameterize a regression model so that the regression model fits, over a range of WER values, empirically observed distributions of measurements y of each WER value.

The first loss function and the second loss function may be any objective function known to persons skilled in the art as operative for each respective learning model to be trained on. Loss functions according to example embodiments of the present disclosure shall be subsequently described in further detail.

A reference dataset may be obtained for an ASR task to be computed by the transformer learning model, and a parameter set may be initialized for each learning model. A reference dataset may include labeled sequences of audio tokens, as described above. Each parameter set may be initialized and may be further fine-tuned during training in manners as known to persons skilled in the art.

Each learning model may be trained on a loss function for multiple iterations, taking reference data of a set batch size per iteration. The learning model may be trained for a set number of epochs, an epoch referring to a period during which an entire dataset (i.e., the above-mentioned reference dataset) is computed by the learning model once; the parameter set is then updated based on computations performed during this period.

Each parameter set may be updated according to gradient descent ("GD") (i.e., updated after computation completes for an epoch), stochastic gradient descent ("SGD"), or any other suitable process for updating parameter sets as known to persons skilled in the art.

Subsequent to each learning model being trained, a computing system may store a learned parameter set for the learning model. Subsequent computation of tasks such as ASR by the transformer learning model may be performed by a computing system loading the parameter set into memory and running one or more sets of computer-executable instructions of the transformer learning model, which may configure one or more processors of the computing system to compute ASR for sample audio data input into the learning model, based on the trained parameter set.

In the computing of an ASR task by a transformer learning model, a sample of input audio signals may be tokenized into a sequence made up of a plurality of audio tokens. In FIG. 2, the audio signal, illustrated by a spectrogram 202 in FIG. 2, is convoluted through a convolutional input layer 204 to tokenize the audio signal. The sequence of audio tokens may be input into an encoder 206 including some number of encoder layers 208, each encoder layer 208 including a multi-head attention layer 210 and a feedforward network 212, causing the encoder 206 to output speech features 214.

Attention layers according to implementations of transformer learning models may perform transformation operations upon tokens input at the attention layer to compute self-attention among the tokens. The transformation operations may output a query matrix (denoted as Q), a key matrix (denoted as K), and a value matrix (denoted as V), which may be used in matrix operations to so that values of tokens are adjusted by values of other tokens by self-attention. Parameters of the transformation operations may be learned during the training process as part of the trained parameter set as described above. Self-attention operations utilizing the Q, K, and V matrices are known to persons skilled in the art and need not be reiterated herein.

The speech features 214, which are subsequently denoted by s, may represent a sequence of features, where each feature may represent a positive determination of an utterance among the audio tokens, whether correct or erroneous. The encoder outputs the speech features s, which are then embedded by an embedding layer 216 into a multi-dimensional feature space by mapping the speech features s to a feature matrix in the multi-dimensional feature space.

Subsequently, conventionally, the feature matrix may be input into a multi-head attention layer of a decoder, passed to some number of multi-head attention layers and some number of feedforward layers of the decoder, and output from the decoder. The decoder may output a sequence of word tokens corresponding to the sequence of audio tokens. However, according to example embodiments of the present disclosure, the feature matrix may be input into a memory encoder 218, where features of the feature matrix are masked by a masking multi-head attention layer 220, and the feature matrix is passed to some number of multi-head attention layers 222 and some number of feedforward network 224 of the memory encoder 218, and output from the memory encoder 218 as a sequence of feature representations.

Moreover, an ASR transformer learning model according to example embodiments of the present disclosure may determine a mask to apply to a multi-head attention layer which receives a sequence of audio tokens as input. A mask may be applied to each of a multi-head attention layer of the encoder and a multi-head attention layer of the decoder. A masked multi-head attention layer may cause one or more tokens of a sequence of audio tokens to be replaced by a non-audio token, which may be denoted by the syntax of [MASK], for example. By performing a masking operation upon some number of tokens, the multi-head attention layer may compute attention between tokens of the sequence, and then predict, based on the computed attention, the masked tokens. Transformer learning models may adopt various masking strategies to compute ASR tasks. For example, one masking strategy is future masking, wherein each token after a particular token is masked, and these future tokens are predicted based on each preceding token.

A masked transformer learning model as described above is subsequently denoted as p, which may be expressed according to Equation 1 as follows:

$$p(x_{mask}|x_{unmask}, s)$$

Herein, x represents each token of a sequence, and hence, $x_{unmask}$ represents each token of a sequence before masking, and $x_{mask}$ represents each token of a sequence after masking; p represents probability of $x_{unmask}$ being output based on $x_{mask}$ at an input multi-head attention layer, conditioned upon the speech features s. Thus, a pre-trained transformer learning model according to example embodiments of the present disclosure may be referred to as conditional masked, contrasting from a masked transformer learning model as described above.

As described above, modality of a sequence x is not the same as modality of speech features s. However, by the following processes, the difference in modality is overcome for the purpose of regressing WERs of the ASR transformer learning model.

According to example embodiments of the present disclosure, the memory encoder 218 implements a masking strategy in a masking multi-head attention layer 220 as follows. At the masking multi-head attention layer 220, 15% of features of the feature matrix—i.e., 15% of the utterances which are positively determined among the speech features 214—are masked. This is in contrast to masking of word tokens according to transformer learning models computing translation or prediction tasks. Furthermore, during each epoch of training, this 15% of features is selected at random among the features input at the masking multi-head attention layer 220.

Additionally, a mask matrix is implemented at a self-attention function of the masking multi-head attention layer 220. While a self-attention function is as described above, the mask matrix may implement an additional matrix operation upon the feature matrix during the self-attention operation. According to example embodiments of the present disclosure, the mask matrix may modify the self-attention operation so as to limit it among all features which were not masked, as represented by the following unified operation according to Equation 2:

$$\mathrm{softmax}\left(\frac{Q_x K_x^T}{\sqrt{d/h}} + \mathbb{1}_{ST} M\right) V_x$$

As before, $Q_x$, $K_x$, and $V_x$ are query, key, and value matrices for sequence x, which may be output by a previous layer of the memory encoder. M is a triangular matrix wherein $M_{ij}=-\infty$ where i<j, and $\mathbb{I}_{St}$ is set to 1 to implement the mask matrix M for implementations of the ASR transformer learning model (and may be set to other values for implementations of other transformer learning models).

By this matrix operation, the mask-dependent self-attention operation adjusts the value of each non-masked feature by values of each other non-masked feature, without influence from the masked features.

Based on the function masked transformer learning model, the memory encoder 218 is trained to optimize the following loss function according to Equation 3:

$$\mathcal{L}(x, s; \theta) = -\log p(x_{mask} | x_{unmask}, s; \theta) - \lambda_{ST} \sum_t \log p(x_t | x_{<t}, s; \theta)$$

Herein, $\theta$ is a parameter of the learning model, and $\lambda_{ST}$ may act as a scaling factor. The loss function is a sum of two component loss functions, with the second component loss function being according to example embodiments of the present disclosure.

Subsequently, the memory encoder 218 outputs a sequence of feature representations, as denoted by $\{f_T\}^T_{t-1}$. Subsequent tasks such as classification, which may output an ultimate sequence of word tokens which map to the sequence feature representations, may be performed using the sequence of feature representations, as all features of the sequence of feature representations have been adjusted by all feature information relevant to ASR tasks, such as syntactic information. These subsequent tasks may be implemented in transformer learning models as known to persons skilled in the art, details of which need not be reiterated herein for understanding example embodiments of the present disclosure.

However, the sequence of feature representations unambiguously represents the original input sequence of audio tokens; thus, it may be used to in regression of WER frequencies as described above, in place of subsequent outputs of the transformer learning model. Thus, according to example embodiments of the present disclosure, the sequence of feature representations is also input into a quality evaluation ("QE") model 226. The QE model 226 may ultimately output one or more probabilities of respective WER values, as shall be described in detail subsequently.

At the QE model 226, a Bi-LSTM 228 may be implemented as known to persons skilled in the art to receive the sequence of feature representations and encode the sequence of feature representations as the feature encoding h.

The feature encoding h may first be classified by a binary classification layer 230. The binary classification layer 230 may receive the feature encoding h as input and output one of two classifications: either perfect, or non-perfect, according to a Bernoulli distribution. As a discrete, non-linear statistical distribution, the Bernoulli distribution defines a frequency occurring for WER=0, i.e., a frequency occurring for perfect performance by the ASR transformer learning model. The binary classification layer 230 implements the following model according to the Bernoulli distribution according to Equation 4:

$$p(WER_x=0)=\lambda=\text{sigmoid}(w_\lambda^T h+b_\lambda)$$

In the event that the binary classification layer 230 outputs p=1, the ASR performance of the feature encoding h is classified as perfect. The QE model 226 may output a predicted WER of 0 without performing regression.

In the event that the binary classification layer 230 does not output p=1, the ASR performance of the feature encoding his classified as non-perfect. The QE model 226 then inputs the feature encoding h into a beta regression layer 232.

The beta regression layer 232 may receive the feature encoding h as input and output a prediction of WER based on a trained beta statistical distribution having parameters fitted to empirical output error rates of the transformer learning model during training. Training of the beta regression layer 232 is described subsequently.

A beta statistical distribution is a non-linear continuous distribution undefined when an independent variable has a value of zero. Thus, the beta statistical distribution complements binary classification by the Bernoulli statistical distribution as a second step. A beta statistical distribution may be parameterized such that the distribution is clustered near independent variable values close to zero, thus according with the empirical output error rates of ASR as described above. The beta statistical distribution may be written as the following function according to Equation 5:

$$p(y) = \frac{\Gamma(\phi) y^{\mu\phi-1} 1 - y^{(1-\mu)\phi-1}}{\Gamma(\mu\phi)\Gamma((1-\mu)\phi)}, 0 < y < 1$$

Further parameters of the beta statistical distribution are mean $\mu$ and variance $\sigma$, defined as follows according to Equation 6:

$$\mu = \text{sigmoid}(w_\mu^T h + b_\mu)$$

$$\sigma = \frac{\mu(1-\mu)}{1+\phi}$$

Wherein hyperparameter $\phi$, representing precision, may be estimated based on particular training datasets.

Based on the function of the beta statistical distribution, the beta regression layer 232 is trained to optimize the following loss function:

$$\max \log p(WER_x=0) + \mathbb{1}_{WER_x>0} \cdot \log p(y)$$

Herein, $WER_x=0$ refers to each sample output classified as perfect from the binary classification layer 230, and $WER_x>0$ refers to each sample output classified as non-perfect from the binary classification layer 230; thus, the first term requires the entirety of a reference dataset used during training of the transformer learning model 200. However, p(y) only requires each sample output classified as non-perfect from the binary classification layer 230 (i.e., only those sample outputs input into the beta regression layer 232).

Moreover, it is challenging for the beta regression layer 232 to update parameterization of the beta statistical distribution by gradient descent, as the gradient of p(y) follows a compound gamma distribution including a triple-parameter gamma function $g_\mu(x, s, \mu)$, having both inputs x and s as well as output $\mu$ of the transformer learning model as parameters. Thus, according to example embodiments of the present disclosure, p(y) is replaced with the equivalent loss function according to Equation 7:

$$\bar{\mathcal{L}}_{p=\phi \cdot g_\mu \cdot \text{stop\_gradient}(y^*-\mu^*)}$$

Herein, according to Equations 8, 9, and 10:

$$y^* = \log y/\log(1-y)$$

$$\mu^* = \psi(\phi \cdot g_\mu) - \psi(\phi \cdot (1 - g_\mu))$$

$$\psi(x) = \frac{d}{dx}\log \Gamma(x) = \frac{\Gamma'(x)}{\Gamma(x)}$$

$\psi(x)$ is the digamma function, as known to persons skilled in the art. The equivalence of p(y) and $\tilde{\mathcal{L}}_p$ may be algebraically derived, which need not be further detailed herein. The operations of $\tilde{\mathcal{L}}_p$ facilitate computing of the gradient and thus updating of parameterization of the beta statistical distribution, as a gradient of the digamma function is simpler to compute than a gradient of the compound gamma function.

According to example embodiments of the present disclosure, this regression model based on a combination of a continuous regression function, as well as a discrete statistical distribution, is fitted to empirical measurements of WERs continuously over a range of 0 to 1, where 0 denotes perfect ASR performance with no errors. The fitted regression model may output a value y which, according to Equation 11, represents WER.

$$\lambda \cdot \left(\sum_{y_i \in \mathcal{Y}} p_{y_i} \mathbb{1}_{y=y_i}\right) + (1-\lambda) \cdot p_\mathcal{R}/y(y)$$

Given p(y) expressing a beta statistical distribution as described above, where $\mathcal{Y}=\{0\}$ is a finite set, $p_0=1$, and $\mathbb{1}_{y=y_i}=1$ when $y=y_i$, $\lambda$ represents the probability of whether y has a 0 value (denoting perfect ASR performance) or a non-zero value (denoting non-perfect ASR performance), according to the beta statistical distribution being mixed with the Bernoulli statistical distribution to represent. As the Bernoulli statistical distribution is modeled by a classification model, and the beta statistical distribution is modeled by a regression model, the QE model 226 may be implemented as a multi-task, hierarchical model which overcomes the problem of dual-modality inputs and establishes a novel architecture.

Subsequent to training as described above, the QE model 226 may learn parameters of the Bernoulli statistical distribution and the beta statistical distribution. A trained, parameterized zero-inflated QE model 226 may then receive input from the memory encoder 218 of the trained transformer learning model 200 in the form of feature matrices, and predict a highest probability of WER value (as denoted by y) indicating a quality evaluation result of the trained transformer learning model 200.

Figure 3A:
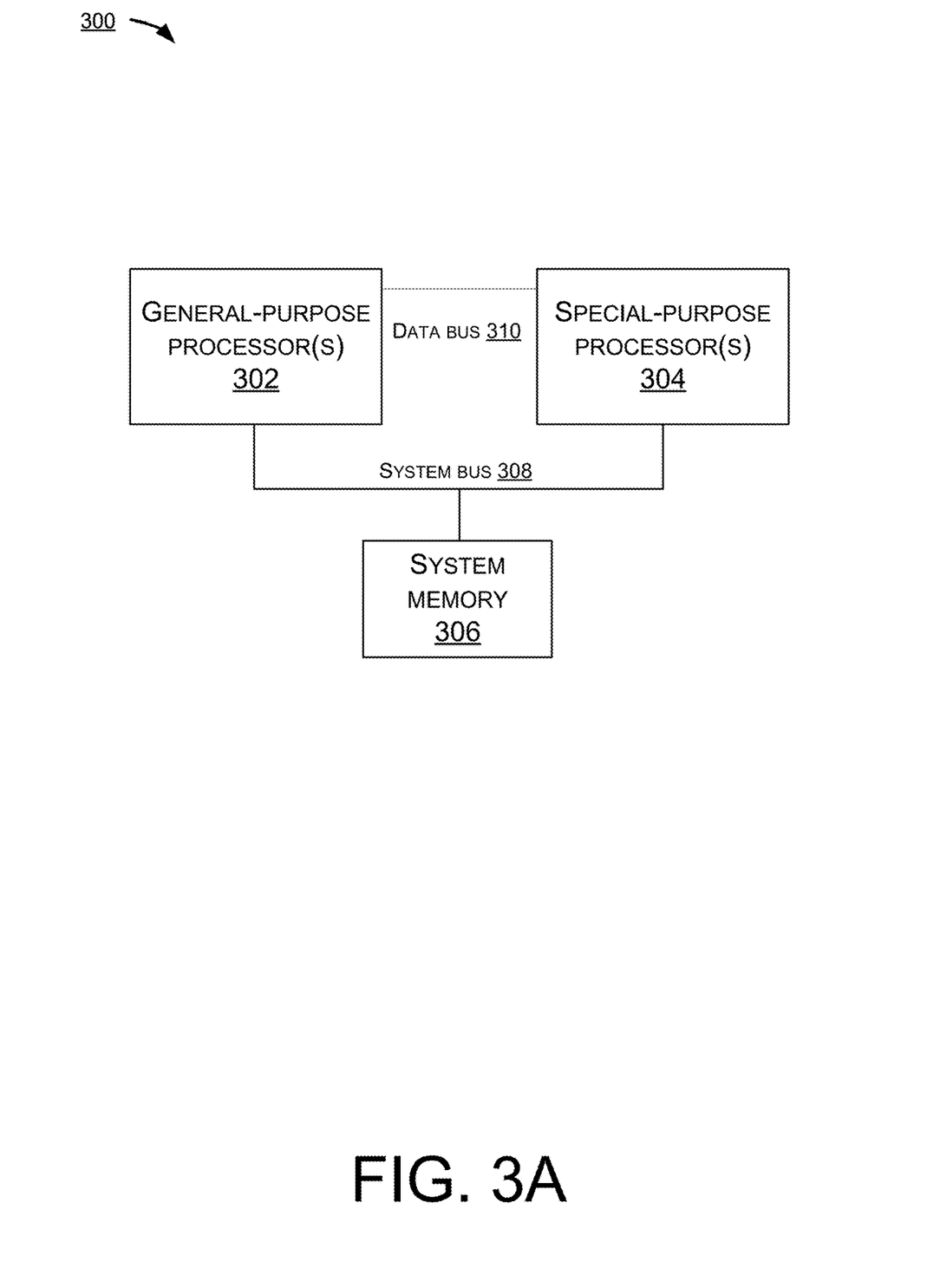
FIG. 3A illustrates a system architecture of a system configured to compute automatic speech recognition and quality estimation thereof according to example embodiments of the present disclosure.
Figure 3B:
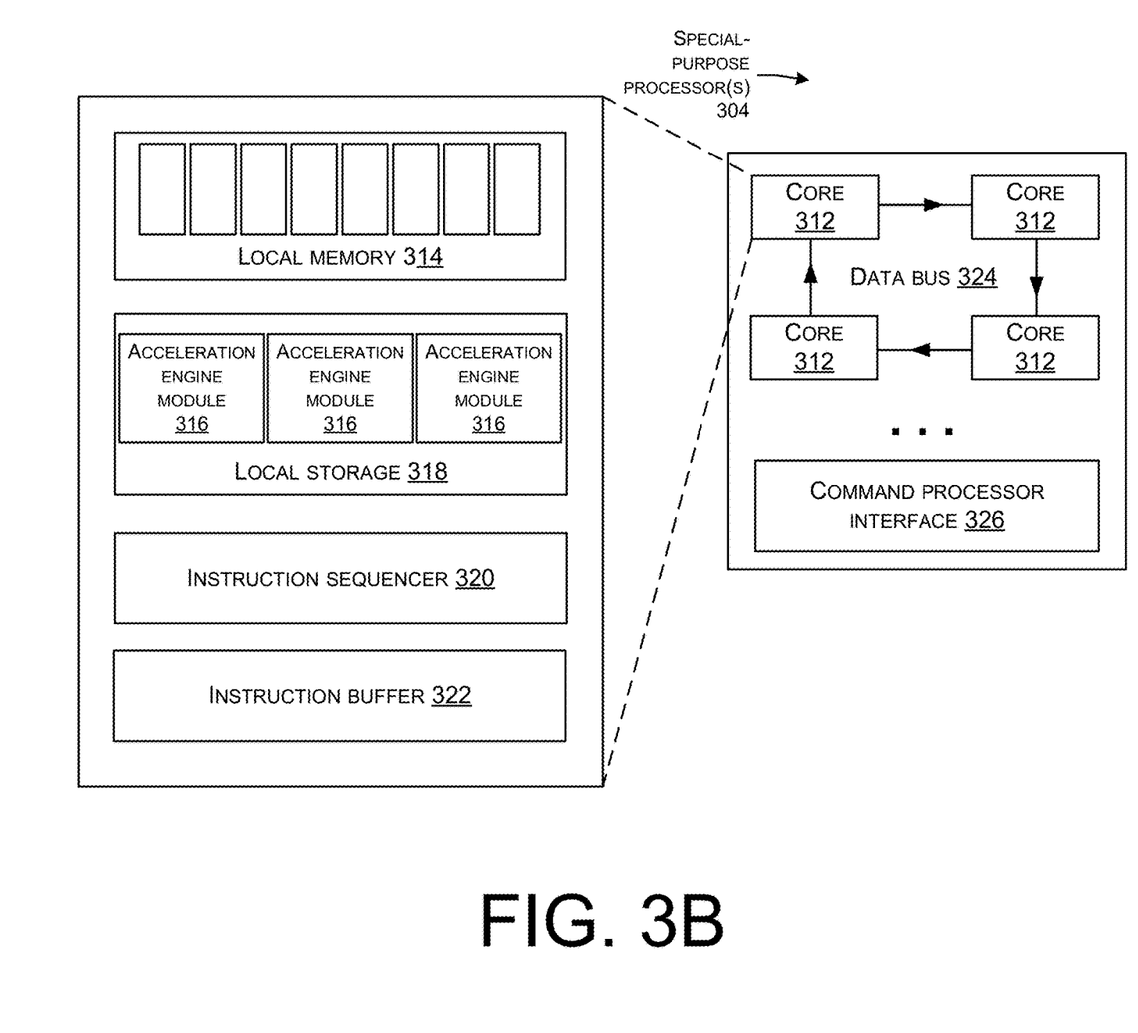
FIG. 3B illustrates a special-purpose processor according to examples of FIG. 3A.

FIG. 3A illustrates a system architecture of a system 300 configured to compute ASR and QE thereof according to example embodiments of the present disclosure. FIG. 3B illustrates a special-purpose processor according to examples of FIG. 3A.

A system 300 according to example embodiments of the present disclosure may include one or more general-purpose processor(s) 302 and one or more special-purpose processor(s) 304. The general-purpose processor(s) 302 and special-purpose processor(s) 304 may be physical or may be virtualized and/or distributed. The general-purpose processor(s) 302 and special-purpose processor(s) 304 may execute one or more instructions stored on a computer-readable storage medium as described below to cause the general-purpose processor(s) 302 or special-purpose processor(s) 304 to perform a variety of functions. Special-purpose processor(s) 304 may be computing devices having hardware or software elements facilitating computation of neural network computing tasks such as training, classification, and regression computations. For example, special-purpose processor(s) 204 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate computation of tasks such as training, classification, and regression, special-purpose processor(s) 304 may, for example, implement engines operative to compute mathematical operations such as matrix operations and vector operations.

A system 300 may further include a system memory 306 communicatively coupled to the general-purpose processor(s) 302 and the special-purpose processor(s) 304 by a system bus 308. The system memory 306 may be physical or may be virtualized and/or distributed. Depending on the exact configuration and type of the system 300, the system memory 306 may be volatile, such as RAM, non-volatile, such as ROM, flash memory, miniature hard drive, memory card, and the like, or some combination thereof.

The system bus 308 may transport data between the general-purpose processor(s) 302 and the system memory 306, between the special-purpose processor(s) 304 and the system memory 306, and between the general-purpose processor(s) 302 and the special-purpose processor(s) 304. Furthermore, a data bus 310 may transport data between the general-purpose processor(s) 302 and the special-purpose processor(s) 304. The data bus 310 may, for example, be a Peripheral Component Interconnect Express ("PCIe") connection, a Coherent Accelerator Processor Interface ("CAPI") connection, and the like.

FIG. 3B illustrates an example of special-purpose processor(s) 304, including any number of core(s) 312. Processing power of the special-purpose processor(s) 304 may be distributed among the core(s) 312. Each core 312 may include local memory 314, which may contain pre-initialized data, such as model weights, or data structures, such as constant buffers for batch normalization or quantization, for the performance of special-purpose computing. Each core 312 may further be configured to execute one or more sets of computer-executable acceleration engine modules 316 pre-initialized on local storage 318 of the core 312, which may each be executable by the core(s) 312, including execution in parallel by multiple core(s) 312, to perform or accelerate, for example, arithmetic operations such as matrix multiplication or matrix transformation, function operations such as convolution, specially defined operations such as pooling of convolutional layers, interpolation, region-of-interest operations, or data operations. Each core 312 may further include an instruction sequencer 320, which receives and orders instructions received from an instruction buffer 322. Some number of core(s) 312, such as four, may be in communication by a data bus 324, such as a unidirectional ring bus. Software drivers controlling operation of each core 312 may control the core(s) 312 and synchronize their operations by sending executable commands through a command processor interface 326.

Figure 4:
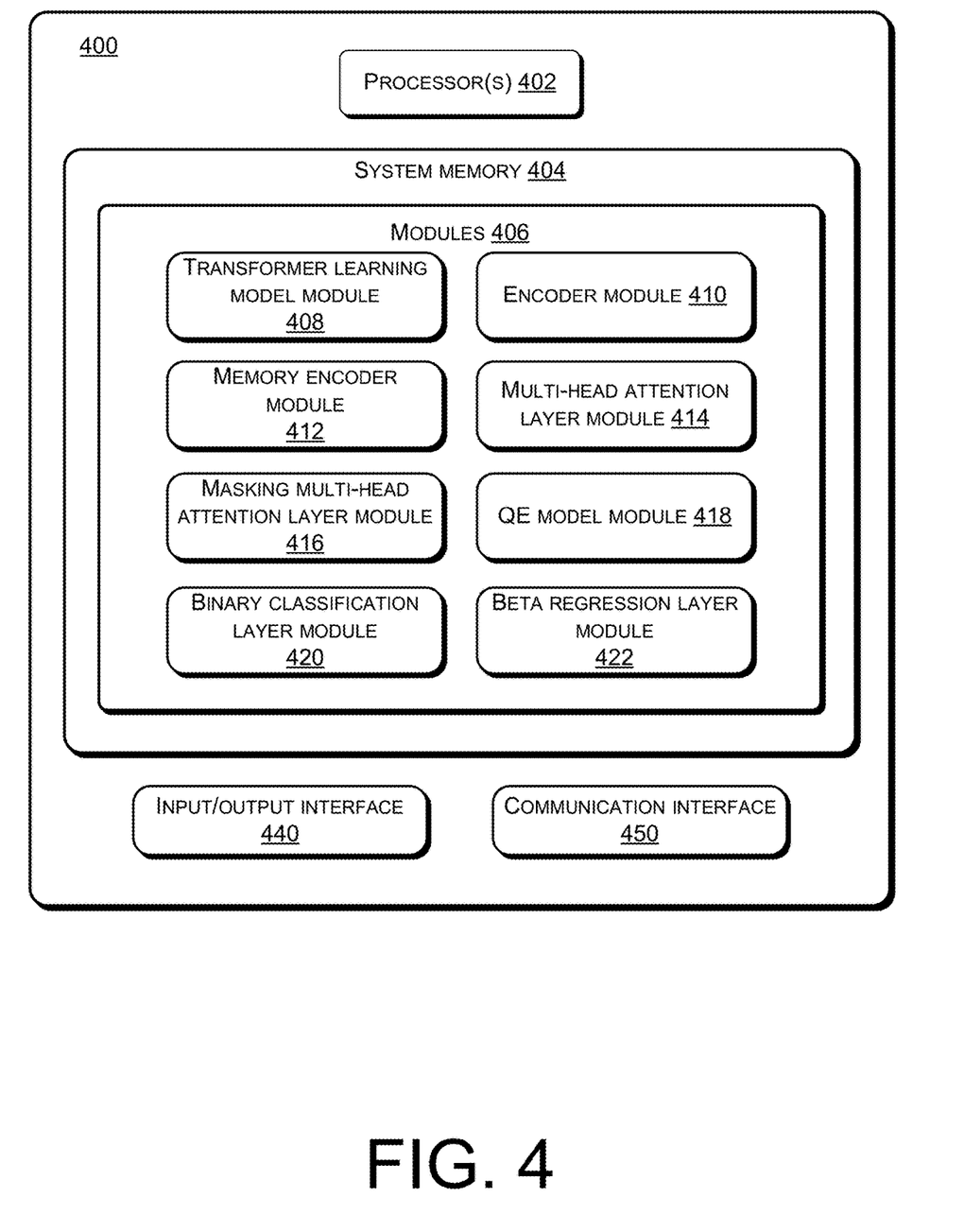
FIG. 4 illustrates an example computing system for implementing the processes and methods described herein for implementing automatic speech recognition and quality estimation techniques for learning models.

FIG. 4 illustrates an example computing system 400 for implementing the processes and methods described above for implementing automatic speech recognition and quality estimation techniques for learning models.

The techniques and mechanisms described herein may be implemented by multiple instances of the end device system 400, as well as by any other computing device, system, and/or environment. The computing system 400 may be any varieties of computing devices, such as personal computers, personal tablets, mobile devices, or other such computing devices operative to perform matrix arithmetic computations. The system 400 may be a distributed system composed of multiple physically networked computers or web servers, a physical or virtual cluster, a computing cloud, or other networked computing architectures providing physical or virtual computing resources as known by persons skilled in the art. The system 400 shown in FIG. 4 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 400 may include one or more processors 402 and system memory 404 communicatively coupled to the processor(s) 402. The processor(s) 402 and system memory 404 may be physical or may be virtualized and/or distributed. The processor(s) 402 may execute one or more modules and/or processes to cause the processor(s) 402 to perform a variety of functions. In embodiments, the processor(s) 402 may include a central processing unit ("CPU"), a GPU, an NPU, a TPU, any combinations thereof, or other processing units or components known in the art. Additionally, each of the processor(s) 402 may possess its own local memory, which also may store program modules, program data, and/or one or more operating systems.

Depending on the exact configuration and type of the system 400, the system memory 404 may be volatile, such as RAM, non-volatile, such as ROM, flash memory, miniature hard drive, memory card, and the like, or some combination thereof. The system memory 404 may include one or more computer-executable modules 406 that are executable by the processor(s) 402.

The modules 406 may include, but are not limited to, a transformer learning model module 408, an encoder module 410, a memory encoder module 412, a multi-head attention layer module 414, a masking multi-head attention layer module 416, a QE model module 418, a binary classification layer module 420, and a beta regression layer module 422.

The transformer learning model module 408 may be configured to receive a sequence of audio tokens as input, and output a sequence of feature representations, as described above with reference to FIG. 2.

The encoder module 410 may be configured to receive a sequence of audio tokens as input, and output speech features, as described above with reference to FIG. 2.

The memory encoder module 412 may be configured to receive a feature matrix as input, and output a sequence of feature representations, as described above with reference to FIG. 2.

The multi-head attention layer module 414 may be configured to perform transformation operations upon tokens input at the attention layer to compute self-attention among the tokens, as described above with reference to FIG. 2.

The masking multi-head attention layer module 416 may be configured to perform transformation operations upon tokens input at the attention layer to compute self-attention among the tokens and apply a mask to at least some of the tokens, as described above with reference to FIG. 2.

The QE model module 418 may be configured to receive a sequence of feature representations as input, and output one or more probabilities of respective WER values, as described above with reference to FIG. 2.

The binary classification layer module 420 may be configured to receive a feature encoding as input, and output one of two classifications, as described above with reference to FIG. 2.

The beta regression layer module 422 may be configured to receive a feature encoding as input and output a prediction of WER based on a trained beta statistical distribution, as described above with reference to FIG. 2.

The system 400 may additionally include an input/output ("I/O") interface 440 and a communication module 450 allowing the system 400 to communicate with other systems and devices over a network. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1 and 2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides implementing quality estimation for automatic speech recognition, and more specifically training an ASR model, and training a QE model to perform word error rate prediction upon the trained ASR model. The ASR model may be a transformer learning model having an architecture including an encoder including multi-head attention layers, and a memory encoder including a masking multi-head attention layer. The QE model may include a binary classification model and a regression model, where the binary classification model is based on a discrete statistical distribution, and the regression model is based on a continuous statistical distribution. Training the ASR model may produce output having variable word error rates, and the QE model may be trained based on empirical word error rates of the ASR model. The QE model may predict performance of the ASR model without labor-intensive labeling to generate ground truth.

Example Clauses

A. A method comprising: training a transformer learning model on inputs comprising a sequence of audio tokens, the trained transformer learning model being executable by one or more processors of a computing system to output a sequence of feature representations; and training a quality estimation learning model on inputs comprising the sequence of feature representations, the trained quality estimation learning model being executable by the one or more processors to output a probability of a word error rate value.

B. The method as paragraph A recites, wherein the transformer learning model comprises an encoder and a memory encoder.

C. The method as paragraph B recites, wherein the encoder is trained to be executable by the one or more processors to output a plurality of speech features, and the memory encoder is trained on a feature matrix comprising an embedding of the plurality of speech features.

D. The method as paragraph B recites, wherein the memory encoder comprises a masking multi-head attention layer.

E. The method as paragraph D recites, further comprising masking, at the masking multi-head attention layer, a plurality of features of the feature matrix.

F. The method as paragraph E recites, further comprising computing attention among non-masked features of the feature matrix.

G. The method as paragraph A recites, wherein the quality estimation learning model comprises a binary classification model and a regression model.

H. The method as paragraph G recites, wherein the binary classification model is trained to be executable by the one or more processors to output one of: a perfect classification comprising a probability of a word error rate value of zero, and a non-perfect classification.

I. The method as paragraph G recites, wherein the binary classification model is trained to be executable by the one or more processors to perform binary classification based on a Bernoulli statistical distribution.

J. The method as paragraph G recites, wherein the regression model is trained to be executable by the one or more processors to output a probability of a word error rate value of non-zero, based on a beta statistical distribution.

K. A system comprising: one or more processors; and memory communicatively coupled to the one or more processors, the memory storing computer-executable modules executable by the one or more processors that, when executed by the one or more processors, perform associated operations, the computer-executable modules comprising: a transformer learning model module trained to be executable by the one or more processors to receive inputs comprising a sequence of audio tokens, and output a sequence of feature representations; and a quality estimation learning model trained to be executable by the one or more processors to receive inputs comprising the sequence of feature representations, and output a probability of a word error rate value.

L. The system as paragraph K recites, wherein the transformer learning model module comprises an encoder module and a memory encoder module.

M. The system as paragraph L recites, wherein the encoder module is trained to be executable by the one or more processors to output a plurality of speech features, and the memory encoder module is trained on a feature matrix comprising an embedding of the plurality of speech features.

N. The system as paragraph L recites, wherein the memory encoder module comprises a masking multi-head attention layer module.

O. The system as paragraph N recites, wherein the masking multi-head attention layer module is executable by the one or more processors to mask a plurality of features of the feature matrix.

P. The system as paragraph O recites, wherein the masking multi-head attention layer module is further executable by the one or more processors to compute attention among non-masked features of the feature matrix.

Q. The system as paragraph K recites, wherein the quality estimation learning model module comprises a binary classification model module and a regression model module.

R. The system as paragraph Q recites, wherein the binary classification model module is trained to be executable by the one or more processors to output one of: a perfect classification comprising a probability of a word error rate value of zero, and a non-perfect classification.

S. The system as paragraph Q recites, wherein the binary classification model module is trained to be executable by the one or more processors to perform binary classification based on a Bernoulli statistical distribution.

T. The system as paragraph Q recites, wherein the regression model module is trained to be executable by the one or more processors to output a probability of a word error rate value of non-zero, based on a beta statistical distribution.

U. A computer-readable storage medium storing computer-readable instructions executable by one or more processors, that when executed by the one or more processors, cause the one or more processors to perform operations comprising: training a transformer learning model on inputs comprising a sequence of audio tokens, the trained transformer learning model being executable by the one or more processors to output a sequence of feature representations; and training a quality estimation learning model on inputs comprising the sequence of feature representations, the trained quality estimation learning model being executable by the one or more processors to output a probability of a word error rate value.

V. The computer-readable storage medium as paragraph U recites, wherein the transformer learning model comprises an encoder and a memory encoder.

W. The computer-readable storage medium as paragraph V recites, wherein the encoder is trained to be executable by the one or more processors to output a plurality of speech features, and the memory encoder is trained on a feature matrix comprising an embedding of the plurality of speech features.

X. The computer-readable storage medium as paragraph V recites, wherein the memory encoder comprises a masking multi-head attention layer.

Y. The computer-readable storage medium as paragraph X recites, wherein the operations further comprise masking, at the masking multi-head attention layer, a plurality of features of the feature matrix.

Z. The computer-readable storage medium as paragraph Y recites, wherein the operations further comprise computing attention among non-masked features of the feature matrix.

AA. The computer-readable storage medium as paragraph U recites, wherein the quality estimation learning model comprises a binary classification model and a regression model.

AB. The computer-readable storage medium as paragraph AA recites, wherein the binary classification model is trained to be executable by the one or more processors to output one of: a perfect classification comprising a probability of a word error rate value of zero, and a non-perfect classification.

AC. The computer-readable storage medium as paragraph AA recites, wherein the binary classification model is trained to be executable by the one or more processors to perform binary classification based on a Bernoulli statistical distribution.

AD. The computer-readable storage medium as paragraph AA recites, wherein the regression model is trained to be executable by the one or more processors to output a probability of a word error rate value of non-zero, based on a beta statistical distribution.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   training a transformer learning model on inputs comprising a sequence of audio tokens, the trained transformer learning model being executable by one or more processors of a computing system to output a sequence of feature representations; and
   training a quality estimation learning model on inputs comprising the sequence of feature representations, the trained quality estimation learning model being executable by the one or more processors to output a probability of a word error rate value.

2. The method of claim 1, wherein the transformer learning model comprises:
   an encoder trained to be executable by the one or more processors to output a plurality of speech features; and
   a memory encoder trained on a feature matrix comprising an embedding of the plurality of speech features.

3. The method of claim 2, wherein the memory encoder comprises a masking multi-head attention layer; and
   further comprising:
      masking, at the masking multi-head attention layer, a plurality of features of the feature matrix; and
      computing attention among non-masked features of the feature matrix.

4. The method of claim 1, wherein the quality estimation learning model comprises a binary classification model and a regression model.

5. The method of claim 4, wherein the binary classification model is trained to be executable by the one or more processors to output one of:
   a perfect classification comprising a probability of a word error rate value of zero, and
   a non-perfect classification.

6. The method of claim 4, wherein the binary classification model is trained to be executable by the one or more processors to perform binary classification based on a Bernoulli statistical distribution.

7. The method of claim 4, wherein the regression model is trained to be executable by the one or more processors to output a probability of a word error rate value of non-zero, based on a beta statistical distribution.

8. A system comprising:
   one or more processors; and
   memory communicatively coupled to the one or more processors, the memory storing computer-executable modules executable by the one or more processors that, when executed by the one or more processors, perform associated operations, the computer-executable modules comprising:
      a transformer learning model module trained to be executable by the one or more processors to receive inputs comprising a sequence of audio tokens, and output a sequence of feature representations; and
      a quality estimation learning model trained to be executable by the one or more processors to receive inputs comprising the sequence of feature representations, and output a probability of a word error rate value.

9. The system of claim 8, wherein the transformer learning model module comprises:
   an encoder module trained to be executable by the one or more processors to output a plurality of speech features; and
   a memory encoder module trained on a feature matrix comprising an embedding of the plurality of speech features.

10. The system of claim 9, wherein the memory encoder module comprises a masking multi-head attention layer module;
    wherein the masking multi-head attention layer module is executable by the one or more processors to mask a plurality of features of the feature matrix; and wherein the masking multi-head attention layer module is further executable by the one or more processors to compute attention among non-masked features of the feature matrix.

11. The system of claim 9, wherein the quality estimation learning model module comprises a binary classification model module and a regression model module.

12. The system of claim 11, wherein the binary classification model module is trained to be executable by the one or more processors to output one of:
   a perfect classification comprising a probability of a word error rate value of zero, and
   a non-perfect classification.

13. The system of claim 11, wherein the binary classification model module is trained to be executable by the one or more processors to perform binary classification based on a Bernoulli statistical distribution.

14. The system of claim 11, wherein the regression model module is trained to be executable by the one or more processors to output a probability of a word error rate value of non-zero, based on a beta statistical distribution.

15. A computer-readable storage medium storing computer-readable instructions executable by one or more processors, that when executed by the one or more processors, cause the one or more processors to perform operations comprising:
   training a transformer learning model on inputs comprising a sequence of audio tokens, the trained transformer learning model being executable by the one or more processors to output a sequence of feature representations; and
   training a quality estimation learning model on inputs comprising the sequence of feature representations, the trained quality estimation learning model being executable by the one or more processors to output a probability of a word error rate value.

16. The computer-readable storage medium of claim 15, wherein the transformer learning model comprises:
   an encoder trained to be executable by the one or more processors to output a plurality of speech features; and
   a memory encoder trained on a feature matrix comprising an embedding of the plurality of speech features.

17. The computer-readable storage medium of claim 16, wherein the memory encoder comprises a masking multi-head attention layer; and
   wherein the operations further comprise:
      masking, at the masking multi-head attention layer, a plurality of features of the feature matrix; and
      computing attention among non-masked features of the feature matrix.

18. The computer-readable storage medium of claim 15, wherein the quality estimation learning model comprises a binary classification model and a regression model.

19. The computer-readable storage medium of claim 18, wherein the binary classification model is trained to be executable by the one or more processors to output one of:
   a perfect classification comprising a probability of a word error rate value of zero, and
   a non-perfect classification.

20. The computer-readable storage medium of claim 18, wherein the regression model is trained to be executable by the one or more processors to output a probability of a word error rate value of non-zero, based on a beta statistical distribution.

* * * * *